United States Patent [19]

Brenac

[11] 4,197,512

[45] Apr. 8, 1980

[54] DEVICE FOR COOLING A LASER HEAD

[75] Inventor: Luc Brenac, Paris, France

[73] Assignee: Societe Anonyme dite: Compagnie Industrielle des Lasers, Marcoussis, France

[21] Appl. No.: 839,473

[22] Filed: Oct. 4, 1977

[30] Foreign Application Priority Data

Oct. 14, 1976 [FR] France ................................ 76 30895

[51] Int. Cl.² ............................................. H01S 30/45
[52] U.S. Cl. .......................... 331/94.5 P; 331/94.5 D; 331/94.5 E; 331/94.5 F
[58] Field of Search ..................... 331/94.5 P, 94.5 D, 331/94.5 E, 94.5 F; 165/DIG. 10, 107 D, 114; 55/16

[56] References Cited

U.S. PATENT DOCUMENTS

| | | | |
|---|---|---|---|
| 3,487,751 | 1/1970 | Meijer et al. | 55/16 |
| 3,599,113 | 8/1971 | Cremosnik | 331/94.5 D |
| 3,651,616 | 3/1972 | Blanchard et al. | 55/16 |
| 3,659,220 | 4/1972 | Erickson | 331/94.5 D |

*Primary Examiner*—William D. Larkins
*Attorney, Agent, or Firm*—Sughrue, Rothwell, Mion, Zinn and Macpeak

[57] ABSTRACT

The invention relates to a device for cooling a laser head by a flow of liquid. A tank of this liquid, is provided at the upper part of the device and has a membrane which is impermeable to the liquid and permeable to gases. Application to solid laser generators with triggered operation and a high repetition rate.

12 Claims, 2 Drawing Figures

DEVICE FOR COOLING A LASER HEAD

FIELD OF THE INVENTION

The present invention relates to devices for cooling a laser head and more particularly to devices for cooling a laser head having a solid active material by the flow of a liquid.

BACKGROUND OF THE INVENTION

In the following text, laser head means not only a laser amplifier comprising simply an active material and excitation means for this material but also covers a laser generator futher having an optical resonant cavity in which the active material is disposed.

Industrial laser heads cooled by a liquid comprise, in general, a chamber filled with a liquid which is often constituted by a mixture of water and anti-freeze. The active material and the flash lamp of the laser head are immersed in this liquid. The sealing of the chamber should prevent all leakage of liquid during transfer and during the operation of the device.

Despite all the precautions taken to prevent air from being dissolved in the liquid, it is observed that gas bubbles are formed within the liquid during operation. There results therefore, an overpressure in the chamber which can cause, after a time, leakages at the seal rings and which disturbs the cooling of the active laser material. When the device comprises a liquid flow pump, these gas bubbles can also unprime the pump.

Preferred embodiments of the present invention mitigate these disadvantages and produce a device for liquid cooling a laser head, in which the gas bubbles which form during operation of the laser are removed without causing leakage of liquid.

SUMMARY OF THE INVENTION

The present invention provides a device for cooling a laser head by a flow of liquid, the laser head comprising a solid active material, a flash lamp and means for feeding electric power to the lamp in order to excite the active material by a light discharge of the lamp. The device comprises a sealed chamber in which the active material and said lamp are immersed, and wherein a part of the wall of said enclosure is constituted by at least one membrane impermeable to the liquid and permeable to gas appearing in the liquid during operation of the head, the membrane faces the horizontal equilibrium surface of said liquid in said chamber.

BRIEF DESCRIPTION OF THE DRAWINGS

The invention is described hereinbelow by way of an illustration having no limiting character, with reference to the accompanying drawings.

DESCRIPTION OF THE PREFERRED EMBODIMENT

Figure 1:
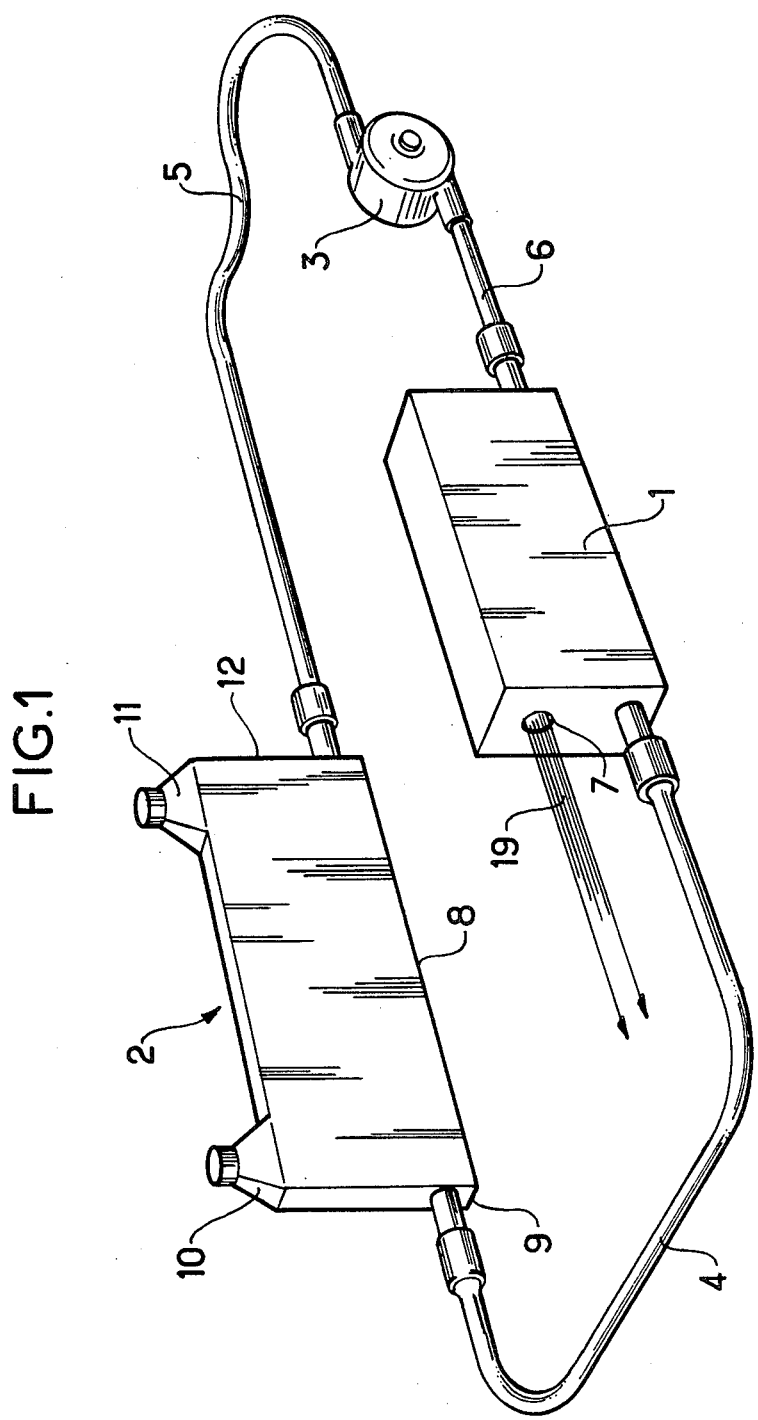
FIG. 1 is a schematic perspective view of an embodiment of the device according to the invention.

FIG. 1 shows a liquid cooling circuit of a laser generator, this circuit comprising mainly a receptacle 1 containing the laser generator, a tank 2 and a flow pump 3. These parts are connected in series by hydraulic pipes; the pipe 4 connecting the receptacle 1 to the tank 2, the pipe 5 connecting the tank 2 to the pump 3 and the pipe 6 connecting the pump 3 to the receptacle 1. The flowing liquid is a mixture of water and ethylene-glycol anti-freeze. Precautions should be taken to ensure water-tight sealing of the liquid circuit, particularly at the joints and hydraulic connections.

The laser generator contained in the receptacle 1 comprises a solid active material (not shown in the figure) constituted for example by yttrium and aluminium garnet doped with neodymium, this material being kept immersed in the liquid inside an optical resonant cavity formed by two reflectors one of which is semi-transparent. A flash lamp (not shown in the figure) is also immersed in the liquid of the receptacle 1. The electrodes of the flash lamp are electrically connected to the terminals of an electric current generator (not shown) outside the receptacle 1. The receptacle 1 is provided with a transparent window 7 to allow the passage of the laser beam 19 which is emitted under the effect of a discharge of the flash lamp.

The tank 2 can have substantially the shape of a rectangular parallelepiped as shown. In the tank 2, the liquid flows substantially in a direction parallel to its length 8, its thickness 9 perpendicular to this direction being small in proportion to the length 8. The tank 2 can advantageously be provided with cooling fins on which a fan blows, these fins and this fan not being shown in the figure.

Two chimneys 10 and 11 situated respectively at each end of the length 8 of the tank 2 are disposed on the upper part of the tank, the axis of these chimneys being substantially parallel to the height 12 of the tank 2.

Figure 2:
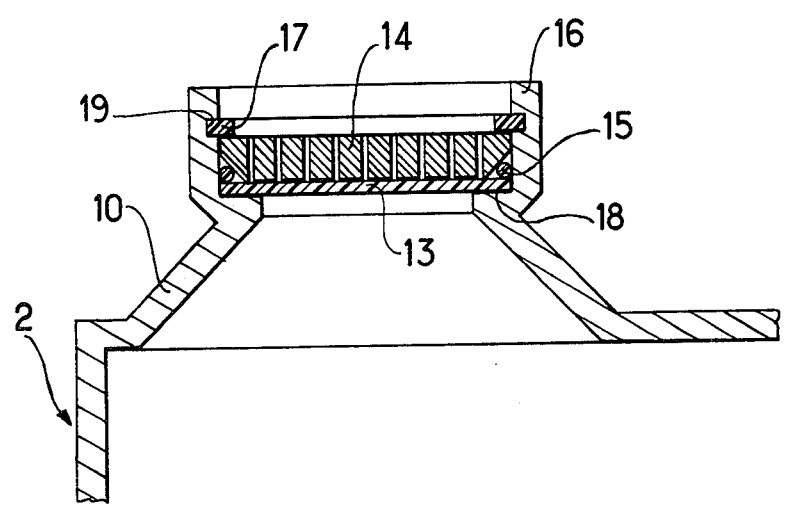
FIG. 2 is a partical cross-section of a part of the device shown in FIG. 1.

In FIG. 2, which represents a cross-section of the chimney 10, it appears that this chimney has substantially the shape of a truncated pyramid which is flared towards the body of the tank 2.

A membrane 13 which is impermeable to the cooling liquid and permeable to gas is fixed at the top of each chimney on a transversal internal protrusion 18 of the chimney so as to block the cross-section of this chimney.

This membrane 13 is made of a porous water-repellent plastics material. This plastics material is polyethylene, polystyrene or preferably polytetrafluorethylene. The thickness of the membrane can be of the order of a tenth of a millimeter. The porosity of the plastics material is open from one surface to the other of the membrane and the size of the pores lies between 0.01 and 0.05 microns. The porosity must correspond to a vacuum ratio lying between 20 and 30%. To obtain such a porosity, the polytetrafluorethylene used must be raw, i.e. it must not have undergone the usual sintering operation at the end of its preparation process.

Above the membrane 13, a metallic grid 14, made e.g. of aluminium, rests on the surface of the membrane 13 in order to increase the rigidity of this membrane. The grid 14 can be used also to compress an O-ring seal 15 bearing against the edge of the membrane 13 and on the inside wall of a cylindrical extension 16 of the chimney 10. A resilient washer 17 which is recessed in a groove 19 of this wall allows the grid 14 to be fixed inside the extension 16.

The device described hereinabove and shown in FIGS. 1 and 2 operates as follows:

First, the various parts of the circuit shown in FIG. 1 are filled with the cooling liquid, the equilibrium surface of the liquid in the tank facing the lower surface of the membranes being as close as possible to these membranes, Filling is effected preferably so that after the pump 3 has been started the liquid exerts a small pressure on the membrane 13, this pressure being for example greater than atmospheric pressure by about 50 grammes.

After the laser generator has been started, the formation of gas bubbles is observed inside the liquid, as has been said hereinabove. It has been observed that these bubbles form more particularly in contact with the flash lamp at the time of the discharges subsequent to the heating of the liquid or by photolysis under the effect of the ultra-violet part of the radiation of the flash lamp. The gas which is formed consists mainly of air, for it is practically impossible to remove completely the air dissolved in the cooling liquid before its use and to prevent any infiltration of air during operation. This gas can contain a small proportion of hydrogen which comes from the decomposition of the ethyene-glycol. The gas bubbles which form within the liquid are driven towards the tank 2 by the circulating flow and burst at the equilibrium surface of this liquid opposite the membranes such as 13. The rising of the bubbles at the equilibrium surface of the liquid in the tank is assisted by the long flat shape of this tank described hereinabove. The gas bubbles then escape through the membranes 13, this making it possible to avoid the disadvantages of devices according to prior art. No leakage of liquid results therefrom, since these membranes are permeable to gas but not to the cooling liquid.

The device according to the present invention can be applied to laser generator with a solid active material, cooled by a liquid and in particular to generators of this type with triggered operation with a high repetition rate.

It must be understood that the invention is in no way limited to the embodiment described and illustrated which has been given only by way of an example. Thus, the membranes such as 13 can be disposed at the top part of a device comprising a single chamber for cooling liquid and not including an auxiliary tank nor a circulation pump. Further, devices can include only one membrane or more than two membranes, the device with two membranes shown in FIG. 1 being particularly recommended when the device as a whole is liable to be inclined at various angles in a vertical plane parallel to the length 8 of the tank.

What we claim is:

1. Device for cooling a laser head by a flow of liquid, the laser head comprising a solid active material, a flash lamp and means for feeding electric power to the lamp in order to excite said active material by a light discharge of the lamp, said device comprising sealed chamber means confining said flow of liquid, said active material and said lamp being immersed in said liquid within said sealed chamber means, said sealed chamber means including a wall comprising at least one membrane impermeable to said liquid and permeable to gas appearing in said liquid during operation of said head, and said membrane facing the horizontal equilibrium surface of said liquid in said chamber means.

2. Device according to claim 1, wherein said membrane is constituted by a porous water-repellent material, the porosity being open, the dimension of the pores lying between 0.01 and 0.05 microns, said porosity corresponding to a vaccum ratio lying between 20 and 30%.

3. Device according to claim 2, wherein the thickness of said membrane is of the order of a tenth of a millimeter.

4. Device according to claim 2, wherein said material is non-sintered polytetrafluorethylene plastics material.

5. Device acording to claim 2, wherein said material is polyethylene.

6. Device according to claim 2, wherein said material is polystyrene.

7. Device according to claim 1, wherein said chamber means comprises:
a receptacle containing said active material and said lamp;
a tank filled with said liquid and communicating by pipes with said receptacle;
and a pump in series with said pipes to cause said liquid to flow between said receptacle and said tank;
and wherein part of the wall of said chamber means comprising said membrane is a part of the wall of said tank.

8. Device according to claim 7, wherein said tank has substantially the shape of a rectangular parallelepiped whose length is parallel to the direction of flow of the liquid, and the thickness of the tank being small in relation to its length.

9. Device according to claim 7, wherein said tank comprises at its upper part at least one chimney whose axis is substantially parallel to the height of said tank and said membrane is disposed so as to block the top of this chimney.

10. Device according to claim 9, wherein the cross-section of said chimney is flared towards the tank.

11. Device according to claim 9, wherein said tank also comprises a grid fixed to the edges of said chimney and disposed on top of said membrane to increase its rigidity.

12. Device according to claim 1, wherein said liquid is a mixture of water and of an anti-freeze.

* * * * *